June 21, 1927.
A. C. JOHNSON
TRACTOR
Filed Nov. 3, 1925
1,633,212
3 Sheets-Sheet 2
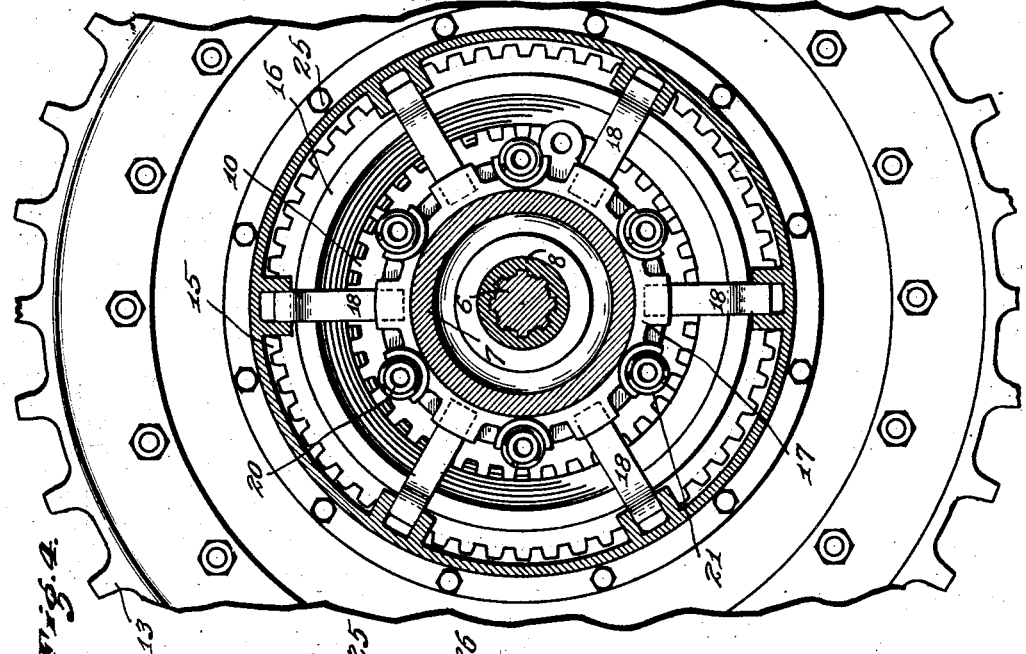
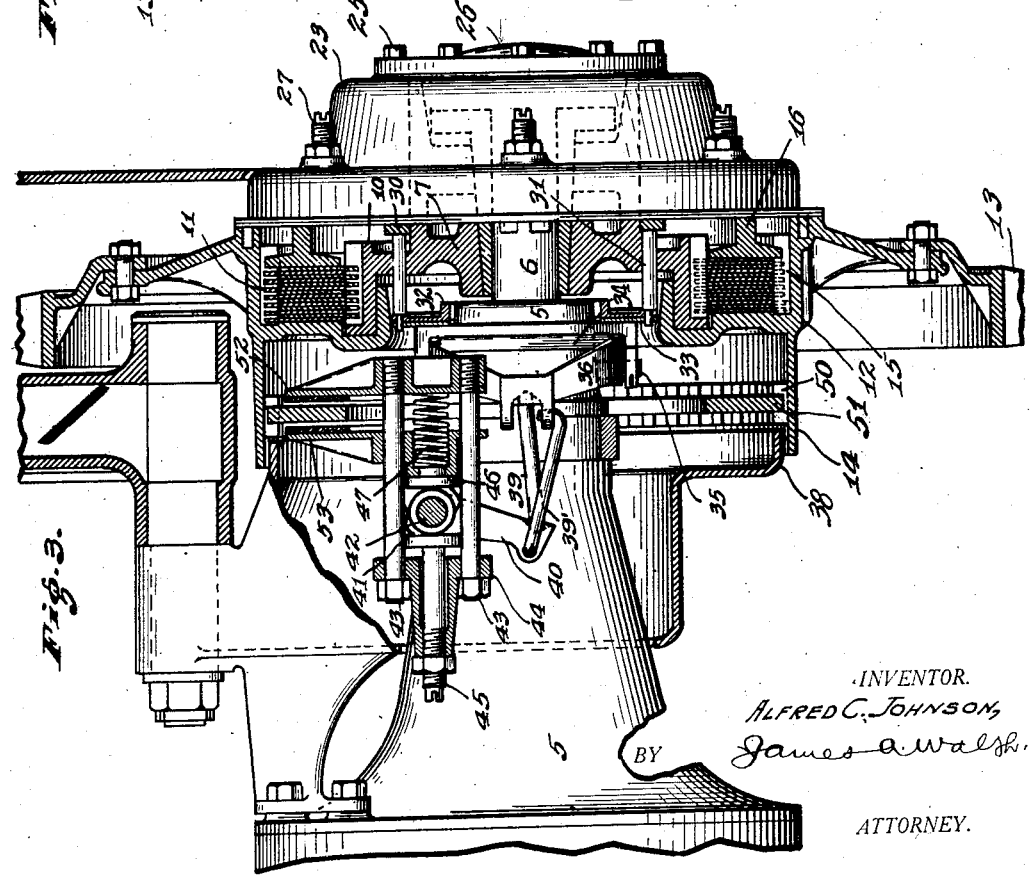
INVENTOR.
ALFRED C. JOHNSON,
BY James A. Walsh.
ATTORNEY.

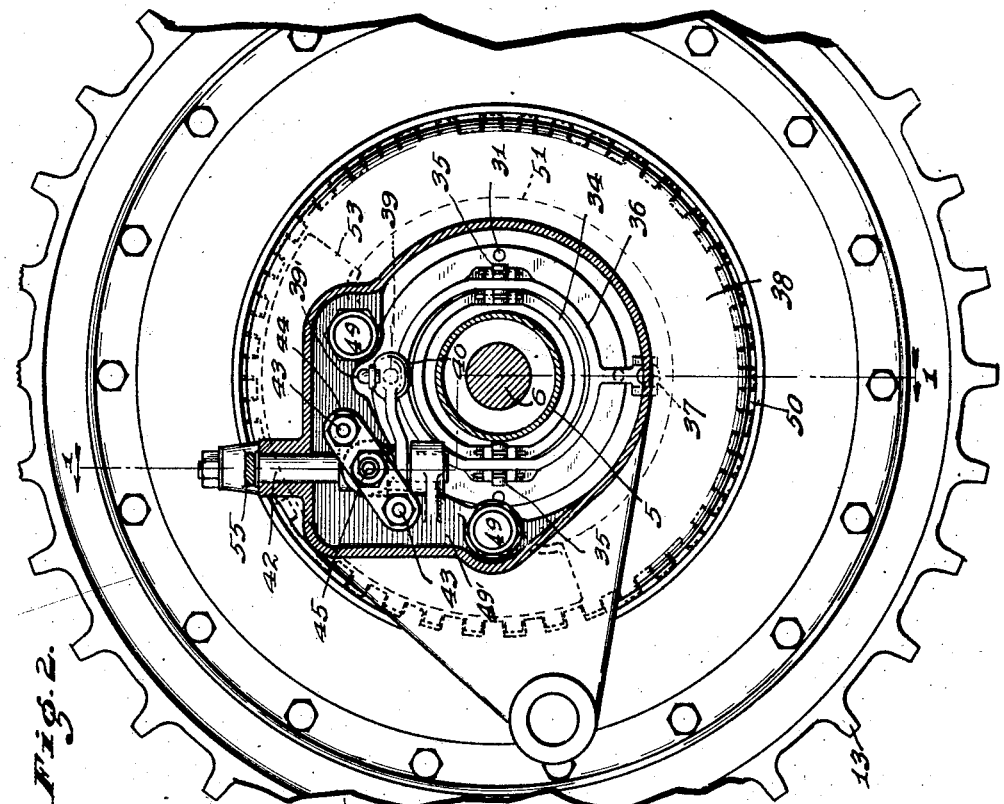

June 21, 1927.

A. C. JOHNSON

TRACTOR

Filed Nov. 3, 1925

1,633,212

3 Sheets-Sheet 3

INVENTOR.
ALFRED C. JOHNSON,

BY James A. Walsh,

ATTORNEY.

Patented June 21, 1927.

1,633,212

UNITED STATES PATENT OFFICE.

ALFRED C. JOHNSON, OF RACINE, WISCONSIN, ASSIGNOR TO BELLE CITY MANUFACTURING COMPANY, OF RACINE, WISCONSIN, A CORPORATION.

TRACTOR.

Application filed November 3, 1925. Serial No. 66,543.

My invention relates to tractors or vehicles of like character, and particularly to the final drive equipment, my object being to provide a simple and compact clutch and brake mechanism for the driving wheels of the tractor, or similar wheels of an attachment for converting an ordinary four-wheel tractor into one of the crawler type, the clutch and brake mechanism being assembled in such manner as to be completely enclosed and protected from dust, mud, and the elements, and so designed as to withstand the hard usage and neglect incident to the use of tractors.

Figure 5:
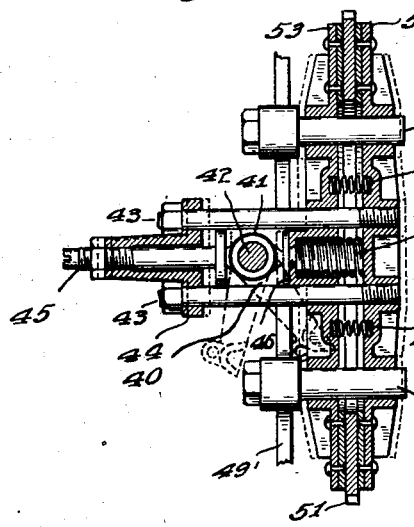
Figure 6:
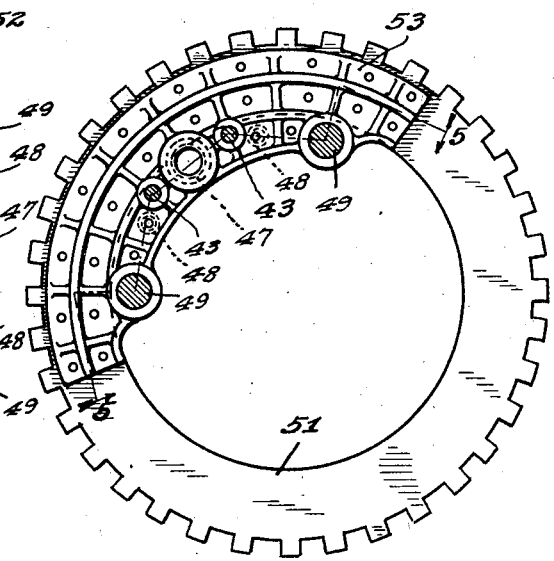
Figure 7:
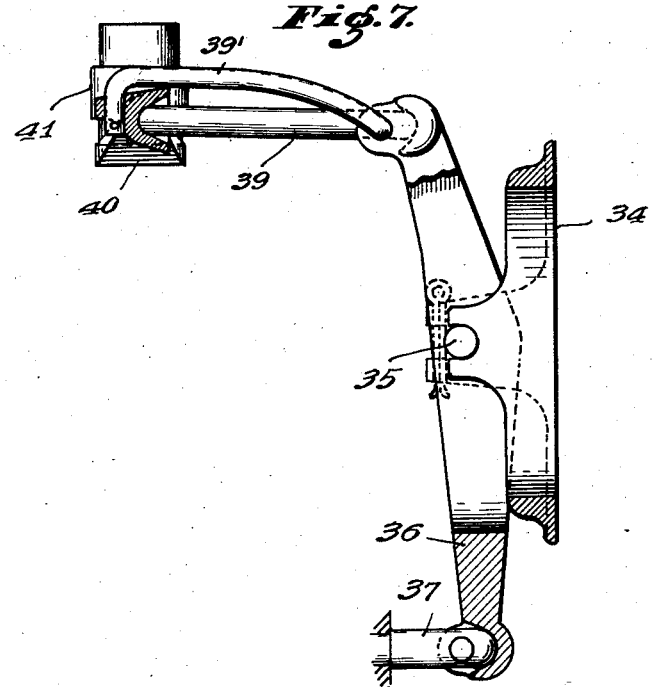

In the accompanying drawings, forming part hereof, Figure 1 is a transverse sectional view through a wheel and its hub embodying my improvements as seen when looking in the direction of the arrows 1—1 in Fig. 2; Fig. 2 a section taken on the dotted line 2—2 in Fig. 1; Fig. 3 a section taken on the dotted line 3—3 in Fig. 1; Fig. 4 a detail section as seen when looking in the direction indicated by the arrows 4—4 in Fig. 1; Fig. 5, a sectional development of the brake, taken on the dotted line 5—5 of Fig. 6; Fig. 6 an elevation of the brake ring and brake plates; and Fig. 7 is an enlarged sectional elevation of part of the shifting mechanism for the brake and clutch.

In said drawings the portions marked 5 indicate the rear axle housing enclosing an axle, 6, mounted in the inner driving hub, 7, by means of the wedge or bushing, 8, secured to said hub by screws or bolts, 9, said hub terminating in a flanged rim, 10, upon which is mounted friction disks, 11. Wheel hub, 12, is mounted upon said inner hub 7, and embodies a sprocket, 13, brake casing, 14, and clutch disk seat, 15, between which and rim 10 on hub 7 said disks 11 are retained by compression ring 16, which is actuated from spring retaining ring, 17, through clutch fingers, 18, loosely mounted in said retaining ring. Said ring 17 is provided with studs, 20, upon which I mount clutch springs, 21, their opposite ends being held by projections, 22, forming part of pilot bearing, 23, the latter being secured to wheel hub, 12, by bolts, 25, and its outer open end together with the parts associated therewith are enclosed by the hub cap, 26. Clutch disks 11, through ring 16 and fingers 18, may be adjusted by the clutch adjusting screws, 27, by simply turning the same from the outside, so that adjustment of these parts is readily accomplished.

Upon hub 7 adjacent retaining ring 17 I mount a clutch release thrust-collar, 30, and by tie pins, 31, connect said collar to an inner clutch release thrust collar, 32, provided with a washer, 33, against which a trunnion thrust ring, 34, contacts, said ring 34 being pivotally mounted, at 35, to a shifting arm, 36, pivotally mounted on a pin, 37, secured in housing, 38, the opposite end of said arm being connected to a thrust-pin, 39, which in turn is loosely mounted in the adjusting lever, 40, extending from cam, 41, mounted on shaft, 42, the latter being positioned between screw bracket studs, 43, mounted in bracket stud, 44, said cam contacting with brake adjusting screw, 45, and brake-shoe washer, 46. As thrust-pin 39 is loosely mounted, I prevent displacement of the same by the tie-rod 39' which connects shifting arm 36 and lever 40.

In brake casing 14 of wheel hub 12 I provide a series of teeth, 50, which teeth engage an axially movable brake disk, 51, and at each side of said brake disk on said pins 43 I mount brake shoes, 52, 53, said pins being threaded into shoe 52, while shoe 53 is movable toward and from said brake disk 51 by the action of brake-shoe washer 46 and cam 41, assisted by the springs, 47, 48, passing through said disk and engaging said shoes. Brake shoes 52, 53, are mounted upon anchor pins, 49, supported by brake housing bracket 49' so that said shoes may readily slide axially thereon or parallel to drive axle 6.

In operation, the clutch mechanisms in both rear driving wheels are normally clutched and the brakes disengaged, so that the wheel hub and axle hub are together driven by the axle, and in disconnecting the clutching and engaging the braking mechanisms or vice versa in either one or both wheels I utilize the steering apparatus of the tractor in the manner fully disclosed in my copending application Serial No. 58,215, filed September 23, 1925. Said steering apparatus I connect to clutch-and-brake lever, 55, mounted on cam-shaft 42, and when it is desired to release the clutch mechanism said lever is actuated to rotate said cam shaft, which in turn imparts motion to adjusting lever 40, causing shifting arm 36 through ring 34 to move against collar 32, which throws the tie-pins 31 against thrust collar 30, and in turn the latter presses against clutch-finger ring 17, which operation releases the tension on the clutch fingers, permitting the clutch disks to disengage, as the pressure imparted by the springs 21 has been removed. As soon as the clutch is disengaged the cam 41 is further actuated through lever 55 to urge the two brake-shoes 52, 53, against the brake-shoe disk, which retards the movement of sprocket 13, so that the first action obtained through the turning of lever 55 is disengagement of the clutch, while the brake action immediately follows, each of said two elements being timed to act immediately the other accomplishes its purpose. While this operation is taking place the action of cam 41 moves adjusting screw 45 outwardly, the latter pulling studs 43 in the same direction, thus causing brake-shoe 52 to become engaged with brake-disk 51, at the same time said cam, through washer 46, forcing brake-shoe 53 against said disk, when the braking action between these parts is accomplished. When lever 55 is thus actuated, as indicated, the clutch becomes released, which permits the tractor to turn under normal conditions, but if not, then greater pressure is imparted to said lever, causing the brake mechanism to become further engaged and stopping rotation of sprocket 13 or resisting its travel, which retardation permits the opposite wheel to travel around the wheel in braked condition and which acts as a pivot for said opposite wheel. In reversing the movement of said lever opposite action of the brake and clutch mechanisms occurs, that is to say, the brake becomes disengaged while the clutch becomes engaged; in other words, when thrust ring 34 is thus released from collar 32 by such reverse movement of lever, 55, springs 21 press against retaining ring 17, actuating clutch fingers 18 into engagement with compression ring 16, thus engaging clutch disks 11, such action causing thrust collar 30 through tie-pins 31 to slightly move inner collar 32, in which manner the actuating elements of the clutch system and the wheel and axle hubs are engaged to cause rotation of said hubs. It will thus be seen that through lever 55 and actuating mechanisms therefor (not shown) on a tractor and under control of an operator the combined brake and clutch mechanism described may be instantly controlled, so that in making short turns these mechanisms in one of the wheels may be actuated and said wheel permitted to rotate independently of the axle, while the opposite or outer wheel may be engaged and drives the opposite wheel; in other words, the outer endless driving track of the tractor is working with a wheel having an engaged clutch only and the brake disengaged, while the clutch of the opposite track, that is, its wheel, is disengaged and the brake engaged. It will be further understood that these adjustments may be made at will as to either wheel or both, and that when running in substantially straight directions both wheels may be readily and properly controlled through the driving axle and the brake and clutch mechanisms described.

I claim as my invention:

1. In a tractor, an axle, a hub on said axle, a wheel-hub on said axle hub, clutch-disks retained between said hubs, a ring for adjusting said clutch disks, means engaging said ring for actuating the same, yielding means urging said ring to normally maintain said clutch disks in engagement, brake mechanisms adjacent said clutch disks, and means for actuating said brake mechanisms and said clutch disks to lock and disengage said wheel-hub from said axle-hub.

2. In a tractor, an axle, a hub on said axle, a wheel-hub on said axle-hub, means for engaging and disengaging said hubs, a brake-disk adjacent said hubs, brake-shoes adapted to engage said disk, a shifting lever having a trunnion ring thereon, and means for actuating said lever and said brake shoes to engage and disengage the same and to disengage and engage said clutch-disks.

3. In a tractor, an axle, a hub secured thereto, a wheel-hub rotatably mounted on said axle-hub, clutch-disks between said hubs, means for shifting said disks into engagement, yielding means for actuating said shifting means, a collar movable by said yielding means, brake mechanism adapted to engage said collar, and means for actuating said brake mechanism to permit the disengagement of said clutch disks.

4. In a tractor, an axle having a driving hub, a wheel-hub mounted on said hub, clutch-disks between said hubs, means for adjusting said disks into and out of engagement, brake mechanism adjacent said hubs, and means for actuating said brake mechanism.

5. In a vehicle, the combination, of an axle, a driving hub on said axle, braking mechanism in said hub, a wheel-hub on said driving hub, clutch mechanism associated with said wheel hub, and means for actuating said brake mechanism to lock said clutch mechanism and to disengage said brake mechanism.

6. In a vehicle, an axle, a hub on said axle, braking mechanism in said hub, a wheel-hub on said axle-hub, clutch mechanism between said hubs for locking the same, brake mechanism associated with said axle-hub, and means for engaging said brake mechanism and disengaging said hubs.

7. In a vehicle, the combination, with an axle, of a hub, brake mechanism in said hub, a wheel-hub rotatably mounted on said hub, clutch disks between said hubs, yielding means in said wheel-hub for causing said disks to engage, and means for actuating said brake mechanism to lock the same and disengage said clutch disks.

8. In a vehicle, the combination, with an axle, of a hub, a brake disk therein, brake-shoes adapted to contact with said disk, means for movably supporting said shoes, a shifting arm in said hub, a wheel-hub on said axle-hub, clutch mechanism therein, and means for engaging said shoes with said brake-disk and actuating said shifting-arm to disengage said clutch mechanism.

9. In a vehicle, the combination, with an axle, of a hub, brake mechanism therein, a wheel-hub, clutch mechanism therein, means for engaging said brake mechanism, means associated with said brake mechanism for disengaging said clutch mechanism, yielding means for engaging said clutch mechanism, and means for actuating said brake and clutch mechanism in sequence.

10. In a vehicle, an axle, wheels mounted thereon, brake mechanisms in said wheels, clutch mechanisms in said wheels, and means for actuating said brake mechanisms to urge said clutch mechanisms into and out of engagement.

11. The combination, with a vehicle, of an axle, a hub mounted thereon, a brake-disk in said hub, brake-shoes adapted to engage said disk, means for supporting said shoes, and means for actuating said shoes to engage the sides of said disk.

12. The combination, with a vehicle, of an axle, a brake, disk movable axially in relation to said axle, brake shoes adjacent said disk, means for supporting said brake-shoes, means for engaging said shoes against said disk, clutch mechanism supported by said axle, and means for actuating said brake shoes into engagement with said disk and disengaging said clutch mechanism.

13. The combination, with a vehicle, of an axle, a casing thereon having a series of teeth, a toothed brake-disk mounted in said teeth, brake-shoes adjacent said disk, means for supporting said brake-shoes, clutch mechanism supported by said axle, and means for actuating said brake-shoes into engagement with said disk and disengaging said clutch mechanism.

14. The combination, with a vehicle, of an axle, a hub thereon, brake mechanism in said hub, a shifting arm in said hub, a cam-shaft in said hub associated with said brake mechanism, a lever extending from said cam-shaft, means for connecting said lever and said shifting arm, clutch mechanism supported by said axle, and means for actuating said cam-shaft to engage said brake mechanism and for actuating said shifting-arm to disengage said clutch mechanism.

15. The combination, with a vehicle, of an axle, brake mechanism on said axle, clutch mechanism on said axle, means for actuating said brake mechanism into and out of engagement, a trunnion ring associated with said brake mechanism, a thrust-collar associated with said clutch mechanism, and means for actuating said brake mechanism for engaging the same and contacting said trunnion-ring with said thrust-collar to disengage said clutch mechanism.

16. The combination, with a vehicle, of an axle, an inner hub having a flanged rim, a wheel-hub having a clutch-disk seat, clutch-disks between said flanged rim and seat, a compression ring for urging said disks into engagement, a retaining ring on said inner hub, fingers mounted in said retaining ring and contacting said compression ring, yielding means for actuating said retaining ring and applying pressure to said compression ring through said fingers, a thrust release clutch-collar engaging said retaining ring, an inner thrust-collar, means connecting said thrust-collars, brake mechanism on said axle, a shifting-arm associated with said brake, means on said arm contacting with said inner thrust-collar, and means for actuating said brake and said arm to engage said brake and cause said contacting means on said arm to engage said inner thrust-collar and disengage said clutch-disks.

17. The combination, with a vehicle, of an axle, a wheel-hub, anchoring means in said hub, a brake-disk in said hub, brake-shoes at opposite sides of said disk and supported on said anchoring means, studs passing through said disk and engaging said shoes, a bracket supporting said studs, an adjusting screw in said bracket, a washer connected to one of said brake-shoes, a cam-shaft between said adjusting screw and said washer for actuating the latter and said studs to contact said brake-shoes against said brake-disk, means for actuating said cam-shaft, an inner hub on said wheel-hub, clutch mechanisms between said hubs, and means associated with said brake mechanism to actuate said clutch when said cam-shaft actuates said mechanism.

18. The combination, with a vehicle, of an axle, braking mechanisms, means for actuating said mechanisms into engagement, yielding means for disengaging said mechanisms, a shifting-arm associated with said brake mechanisms, a multiple disk-clutch, means on said shifting-arm adapted to engage said disk-clutch, means for actuating said brake mechanism into engagement and contacting said shifting-arm into engagement with said clutch to disengage the same.

19. The combination, with a vehicle, of an axle, a brake casing, a brake-disk in said casing, brake-shoes adapted to engage said disk, means for supporting said shoes to permit movement thereof in axial relation to said axle, means for shifting said shoes into and out of engagement with said disk, a shifting-arm pivotally mounted in said casing and connected to said shifting means, an inner hub, a clutch in said hub, and means for actuating said shifting means to disengage said brake mechanism and to urge said clutch into engagement.

20. The combination, with a vehicle, of an axle, a brake on said axle, a multiple disk-clutch on said axle, a cam-shaft for actuating said brake, and means for actuating said cam-shaft to lock said brake and to unlock said clutch-disks in sequence.

21. The combination, with a vehicle, of a brake, a clutch, means for actuating said locking means, and means associated with said brake and contacting said clutch to disengage the same when said brake has been locked.

22. The combination, with a vehicle, of a brake, a cam-shaft for actuating said brake, a lever connected to said shaft, a shifting arm, means for connecting said lever and said shifting-arm, means for actuating said cam-shaft to operate said brake and said shifting-arm, and a clutch operated by said shifting-arm when said cam-shaft is actuated.

23. The combination, with a vehicle, of an axle, a casing, a brake in said casing, a shifting arm in said casing, a cam-shaft for actuating said brake, a lever on said cam-shaft and connected to said shifting-arm, a clutch and mechanism for actuating said cam-shaft to engage said brake and to disengage said clutch.

24. The combination, with a vehicle, of an axle, a brake on said axle, a disk-clutch on said axle, a shaft for actuating the brake, and means for actuating the shaft to lock the brake and to unlock the clutch in sequence.

25. The combination, with a vehicle, of an axle, an inner hub having a flanged rim, a wheel-hub having a clutch-disk seat, clutch disks between said rim and seat, a compression ring for urging the disks into engagement, a retaining ring on said inner hub, fingers mounted in said retaining ring and contacting said compression ring, yielding means for actuating the retaining ring and applying pressure to the compression ring through said fingers, a thrust release clutch-collar engaging said retaining ring, and means for actuating the thrust collar for disengaging said clutch disks.

26. In a vehicle, an axle, wheels mounted on the axle, braking mechanism in each of said wheels, clutch mechanism in each of said wheels, and means on the vehicle under control of an operator for simultaneously or separately actuating the brake mechanisms in the wheels to urge the clutch mechanisms into and out of engagement.

27. In a vehicle, an axle, a wheel on said axle, clutch mechanism in the wheel for locking the wheel to the axle to rotate therewith and for disengaging the wheel from the axle to revolve idly about the axle, a brake in each of the wheels, mechanism associated with the brakes for actuating the clutch mechanisms in the wheels, and means for actuating the brakes to engage and disengage the clutch mechanisms.

In testimony whereof I affix my signature.

ALFRED C. JOHNSON.